United States Patent [19]

Nunnery et al.

[11] E Patent Number: Re. 33,430

[45] Reissued Date of Patent: Nov. 13, 1990

[54] PERSPIRATION BAND FOR HEADGEAR

[76] Inventors: Merle W. Nunnery; Judith Noel, both of 602 Franklin St., Gretna, La. 70053

[21] Appl. No.: 179,246

[22] Filed: Apr. 7, 1988

Related U.S. Patent Documents

Reissue of:

[64] Patent No.: 4,468,817
Issued: Sep. 4, 1984
Appl. No.: 542,457
Filed: Oct. 17, 1983

U.S. Applications:

[63] Continuation of Ser. No. 903,404, Sep. 2, 1986, abandoned.

[51] Int. Cl.[5] ..... A42C 5/02

[52] U.S. Cl. ..... 2/181; 2/181.6; 2/414; 2/DIG. 11

[58] Field of Search ..... 2/181.4, 181, 181.8, 2/171, DIG. 11, 416, 410, 181.6, 414, 209.3

[56] References Cited

U.S. PATENT DOCUMENTS

| | | | |
|---|---|---|---|
| 1,498,505 | 6/1924 | Buchanan | 2/181 |
| 2,136,678 | 11/1936 | Dym | 2/181 |
| 2,159,681 | 3/1937 | Wisman | 2/181 |
| 2,359,387 | 10/1944 | Riddell | 2/181 |
| 2,411,831 | 11/1946 | Lehmberg et al. | 2/181 |
| 2,544,798 | 3/1951 | Lippmann | 2/181 |
| 2,557,123 | 8/1945 | Lyon | 2/181.8 |
| 2,617,988 | 3/1950 | Alesi | 2/181 |
| 2,981,955 | 10/1957 | Ruggiero | 2/181 |
| 3,183,522 | 5/1965 | Groot | 2/181.4 X |
| 3,289,212 | 12/1966 | Morgan | 2/181.4 X |
| 3,685,055 | 8/1972 | Militello | 2/181.4 |
| 3,906,548 | 9/1975 | Kallis | 2/181.4 |
| 4,675,919 | 6/1987 | Heine et al. | 2/181.4 X |

FOREIGN PATENT DOCUMENTS

| | | | |
|---|---|---|---|
| 124654 | 3/1919 | United Kingdom | 2/181 |

*Primary Examiner*—Peter Nerbun
*Attorney, Agent, or Firm*—Thomas S. Keaty

[57] ABSTRACT

This perspiration band provides for more comfortable wearing and non-allergic reaction for its user, when attached to the existing band of a safety hat or other headgear. Primarily, it consists of a washable terrycloth strip, which includes snap fasteners for attachment to the existing hat band.

3 Claims, 1 Drawing Sheet

PERSPIRATION BAND FOR HEADGEAR

Matter enclosed in heavy brackets [ ] appears in the original patent but forms no part of this reissue specification; matter printed in italics indicates the additions made by reissue.

*This is a continuation of application Ser. No. 903,404, filed Sept. 2, 1986 now abandoned.*

BACKGROUND OF THE INVENTION

The field of this invention relates to articles for headgear, and more particularly, a perspiration band for headgear.

The principal object of this invention is to provide a perspiration band for headgear, which will be employed in safety hats, so as to provide greater comfort for the wearer than may be had with the existing [band] *headband* of the hat.

SUMMARY OF THE INVENTION

The prior art of this invention indicates that workers in many industries such as building construction, oil well drilling and the like are required to wear safety helments generally termed as "hard hats". These hard hats are uncomfortable and also disagreeable to wear due to odor from perspiration collected therein.

Another object of this invention is to provide a perspiration band for headgear, which will not give its user an allergic reaction, as occurs with leather and some other materials.

Another object of this invention is to provide a perspiration band for headgear, which will be easy to remove for regular washing, and it also will serve to prevent safety hats from blowing off of the wearer's head.

A further object of this invention is to provide a perspiration band for headgear, which will snap in and out of safety hats of both styles.

A still further object of this invention is to provide a perspiration band for headgear, which will also be adaptable for welding shields, and other forms of headgear.

Other objects are to provide a perspiration band for headgear, which is simple in design, inexpensive to manufacture, rugged in construction, easy to use, and efficient in operation.

These, and other objects, will be readily evident, upon a study of the following specification, and the accompanying drawing[, wherein:] .

[BRIEF DESCRIPTION OF THE DRAWINGS]

*DESCRIPTION OF THE PREFERRED EMBODIMENT*

Figure 1:
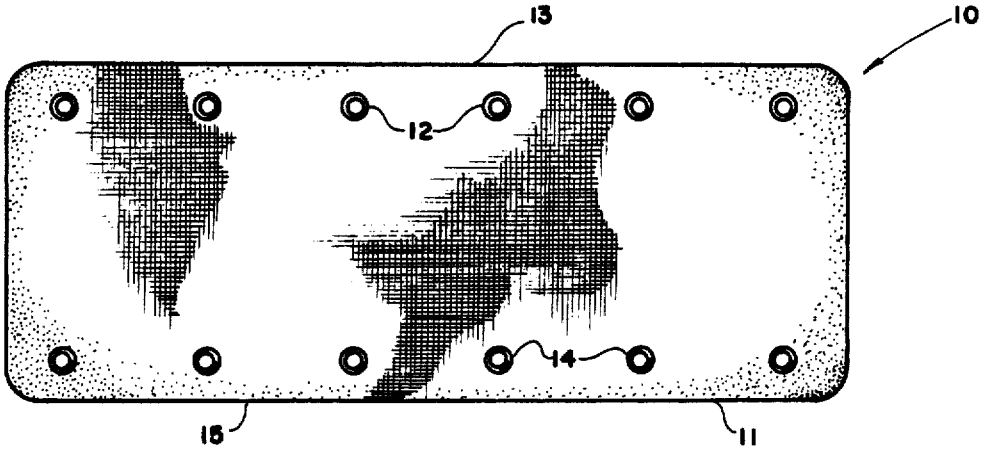
FIG. 1 is a plan view of the present invention.

Accordingly, a perspiration band 10 is shown to include a rectangular configurated strip 11, which is fabricated of a suitable terrycloth material, that is easily washed, so as to be sanitary. A plurality of equally spaced-apart male snap fasteners 12 are fixedly secured near the top longitudinal side edge 13 of strip 11, and a similar number of female snap fasteners 14 are similarly secured near the bottom longitudinal edge 15 of strip 11, so as to fasten band 10 to a [four strap 16 band] *headband* 17 of a *four strap* safety hat (not shown).

Figure 3:
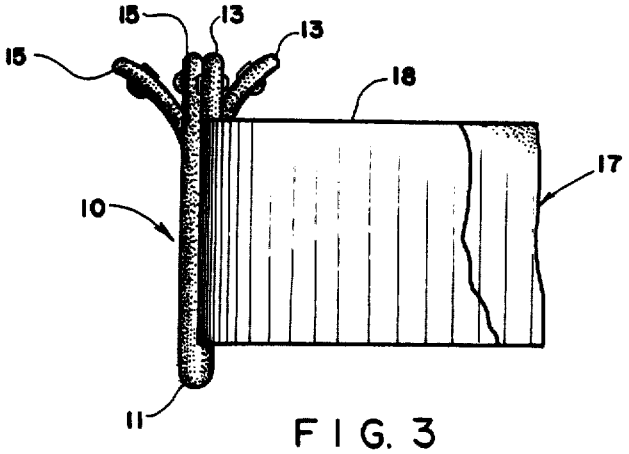
FIG. 3 is a fragmentary side elevational view of FIG. 1, shown secured to an existing safety hat [band] *headband.*

*It should be noted that the width of the band 10 varies depending on the width of the headband 17, so that the fasteners 12 and 14, when in use, fasten above an upper edge 18 of the headband 17, as shown in FIG. 3.*

In use, band 10 is fastened to [strap] *headband* 17, by snappably engaging fasteners 12 and 14 [to their mating fasteners of existing band 17, and the result is, that] *after the band 10 has been wrapped around the headband 17. As can be seen in FIG. 3, the band is folded and wrapped about the headband 17, extending upwardly, slightly above an upper edge 18 of the headband 17. Edges 13 and 15 of the perspiration band 10 in this manner extend above the upper edge 18 of the headband 17 and contact each other in face-to-face engagement (as seen in FIG. 3) and the fasteners 12 and 14, which are attached to one side of the band 10 adjacent the edges 13 and 15, respectively, are fastened above the upper edge 18 of the headband 17. The fasteners 12 are engaged with corresponding mating fasteners 14, which allows the headband 10 to be securely positioned on the headband 17. As a result* strip 11 engages with the forehead and sides of the head of the wearer, and it shall be noted, that band 10 is provided for the four strap band 17 of a safety hat.

Figure 2:
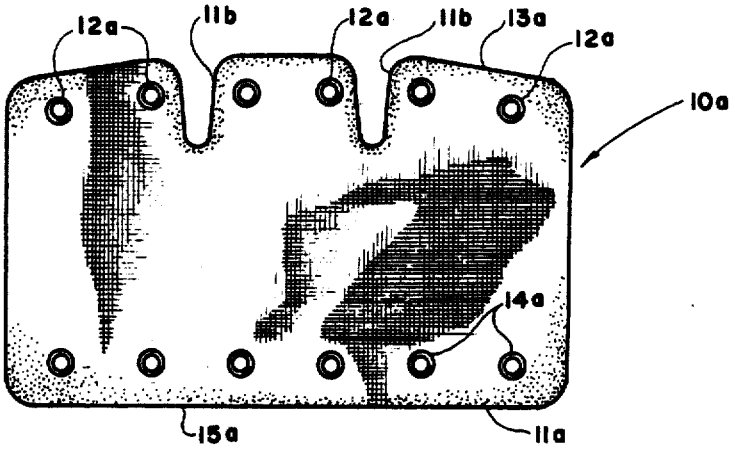
FIG. 2 is a plan view of a modified form of the invention.

Referring now to FIG. 2, a modified band 10a is provided for a six strap band, which is used in another model of safety hat, and band 10a includes a strip 11a, also of terrycloth material, as was heretofore described of strip 11. Strip 11a is provided with male fasteners 12a, which are fixedly secured near the top longitudinal edge 13a, and female fasteners 14a are fixedly secured near the bottom longitudinal edge 15a of *one side of* strp 11a. Strip 11a also includes a pair of cut-outs 11b in the top longitudinal edge 13a, so as to adapt it to the six strap band (not shown) of the modified safety hat.

In use, band 10a is fastened to the modified safety hat, in the same manner heretofore described of band 10.

While various changes may be made in the detail construction, it is understood that such changes will be within the spirit and scope of the present invention, as is defined by the appended claims.

We claim:

1. A perspiration band for headgear, comprising[, in combination,] a [rectangular-shaped] *substantially rectangularly shaped* strip of [washable terrycloth] *flexible, moisture absorbing* material, a plurality of spaced-apart [male snap] fastener elements fixedly secured near a top longitudinal [side] edge of said strip and a like plurality of [female snap] *mating* fastener elements near a bottom longitudinal edge of said strip, [and] said top longitudinal [side] edge [including] *being provided with* a plurality of cut-out notches dividing said edge into a plurality of tabs [each of which contains a pair of said male snap fastener elements so as to adapt fastening said perspiration band to a conventional six strap headband of a safety hat] , *said fastener elements being attached to one side of the perspiration band, so that the perspiration band is secured in covering relationship over at least a part of a safety hat headband, allowing said top longitudinal edge and said bottom longitudinal edge to engage each other above an upper edge of the headband in face-to-face engagement.*

*2. A perspiration band for headgear, having a headband with upper and lower edges, the perspiration band comprising:*

*a substantially rectangular strip of flexible moisture absorbing material having top and bottom edges, and a plurality of fasteners attached adjacent the top and bottom edges of said strip for securing the perspiration band in covering relationshp over at least a part of the headband, so that top and bottom edges of the perspiration band extend above the upper edge of the headband and are secured above the upper edge of the headband in face-to-face engagement.*

*3. A perspiration band for headgear having a headband with upper and lower edges, the perspiration band comprising:*

*a substantially rectangular strip of flexible moisture-absorbing material having a continuous top edge and a continuous bottom edge, said flexible strip having a plurality of fasteners attached in spaced-apart relationship along the top edge of the strip on a first side thereof and a matching number of mating fasteners attached in spaced-apart relationship along the bottom edge of said strip on said first side thereof for securing of the perspiration band in wrappingly covering relationship over at least a part of the headband, so that the top edge and the bottom edge of the perspiration band extend above the upper edge of the headband allowing the fastener elements to be fastened together above the upper edge of the headband and the top and bottom edges of the same side of the perspiration band contacting each other above the upper edge of the headband in face-to-face engagement.*

* * * * *